Figure 1:
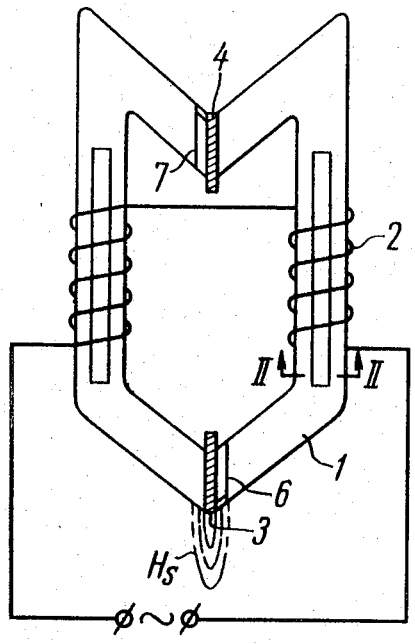

United States Patent

[11] 3,626,344

[72] Inventors Viktor Egorovich Shaternikov
 ulitsa Chapaevskaya, 46/70, kv. 4;
 Vladlen Alexandrovich Denisov, ulitsa
 Krasnoarmeiskaya, 106, kv. 4, both of
 Kuibyshev, U.S.S.R.
[21] Appl. No. 845,265
[22] Filed July 28, 1969
[45] Patented Dec. 7, 1971

[54] EDDY CURRENTS TRANSDUCER FOR ELECTRICAL DEVICES TO CONTROL COATING THICKNESS AND SURFACE PROFILE OF METAL ARTICLES
1 Claim, 4 Drawing Figs.

[52] U.S. Cl. .................................................. 336/73,
 324/40, 336/84, 336/178
[51] Int. Cl. .......................................... H01f 15/04,
 H01f 27/28
[50] Field of Search .................................... 336/73, 84,
 165, 178; 179/100.2 C; 324/40

[56] References Cited
UNITED STATES PATENTS

| | | | |
|---|---|---|---|
| 2,468,601 | 4/1949 | Long | 179/100.2 C |
| 2,535,712 | 12/1950 | Wolfe | 336/178 X |
| 2,660,622 | 11/1953 | Field et al. | 179/100.2 C |
| 2,761,911 | 9/1956 | Camras | 179/100.2 C |
| 2,840,643 | 6/1958 | Brower et al. | 179/100.2 C |
| 2,852,618 | 9/1958 | Hansen | 179/100.2 C |
| 2,916,560 | 12/1959 | Mathez | 336/178 X |
| 3,080,642 | 3/1963 | Woods et al. | 179/100.2 C |
| 3,171,903 | 3/1965 | Wheeler et al. | 179/100.2 C |
| 3,480,736 | 11/1969 | Johnson et al. | 179/100.2 C |

Primary Examiner—Thomas J. Kozma
Attorney—Holman and Stern

ABSTRACT: An eddy current transducer for devices to control and measure the thickness of coatings and the surface profiles of metal articles of complex configuration wherein a ferrite core of an inductance coil features at least one gap where provision is made for a plug made of a high-conductivity nonmagnetic material.

PATENTED DEC 7 1971　　3,626,344

EDDY CURRENTS TRANSDUCER FOR ELECTRICAL DEVICES TO CONTROL COATING THICKNESS AND SURFACE PROFILE OF METAL ARTICLES

The present invention relates generally to electrical devices to measure the thicknesses of coatings and profiles, and more particularly to eddy current transducers employed in devices adapted to control the linear parameters of coatings, such as galvanic and dielectric, and the surface profile of metal articles of complex configuration.

Known in the present state of the art are eddy current transducers incorporating an inductance coil provided with a ferrite core featuring a gap. When an electromagnetic field occurs within the core, a stray flux appears within the zone of the gap. If any metal article under control is introduced into a stray field, eddy currents (Foucault currents) start to originate therein which change the magnetic flux within the core and the gap depending upon the electrophysical properties and the thickness of the coating applied to the article involved.

The intensity of the stray flux depends upon the value of the slot and amounts to approximately 7 to 10 percent of the intensity of the electromagnetic field within the core. Therefore the intensity field variation within the core due to the variations of the stray field is very small and the response of the transducer thus becomes low.

Another disadvantage of the above-mentioned known transducers lies in the fact that the stray field features small directivity which fails to provide control over the surface profile of articles of complex configuration, of articles featuring small radius of curvature, as well as fails to effect measurements within the ribs of the articles involved.

It is a primary object of the present invention to increase the response of the transducer and to provide the possibility of controlling the surface profile of articles featuring both complex configurations and small radii of curvature.

Said object is accomplished by the fact that in the eddy currents transducer incorporating an inductance coil provided with a ferrite core featuring at least one gap wherein an electromagnetic stray flux interacting with the article under control, is created, according to the present invention, provision is made within the gap for a plug fixed in position within said gap and made of a material featuring high conductivity with the result that the electromagnetic stray flux is oriented in the direction of the plug axis.

With such accomplishment of the transducer, within the plug made of a current-conducting material when the stray flux of the core passes therethrough, there occur eddy currents which expel the electromagnetic field out of the slot and create a stray field featuring sharp directivity and substantially higher intensity as compared with the heretofore known transducers. Due the above-mentioned sharp directivity the response of the transducer is considerably increased.

The material used to manufacture the plugs may advantageously be copper or silver.

With a view of diminishing the intensity of the stray field within the space confined by the core, and thus of increasing the intensity of the stray flux within the space where the article under control is to be introduced, the plug provided within the slot may be reasonably made protruding into the space confined by the core.

When employing the transducer core with two gaps it is advantageous that the plugs be provided within both gaps, wherein the outer side edges of the core are coated with a layer of a material featuring high conductivity, and in this case in contact with each of the plugs are those portions of the layer that are applied to the opposite edges of the core with a resultant screen made as a closed electrical turn formed by the above-mentioned layer.

This fact results in a diminished stray flux within the core surface and to a greater extent increased directivity and intensity of the stray field within the slot zone.

Figure 3:
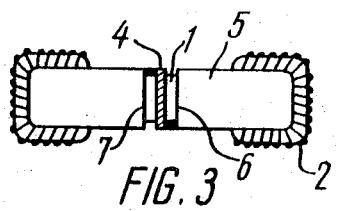
Figure 4:
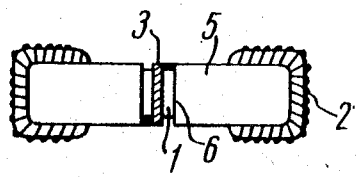
Figure 2:
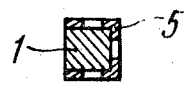

The invention will be described hereinbelow by way of illustration of an exemplary embodiment thereof with due reference to the accompanying drawings, wherein:

FIG. 1 represents an eddy current transducer, front view;
FIG. 2 represents a section II—II of FIG. 1;
FIG. 3 represents the eddy current transducer, top view and
FIG. 4 represents the eddy current transducer, bottom view.

The inventive transducer in contemplation incorporates a ferrite core 1 provided with two gaps whereon an inductance coil 2 is wound. A plug 3 is fixed in position in one of the gaps, while a plug 4 is fixed in position in the other gap. Said plugs are made of high conductivity nonmagnetic material such as copper or silver. The plugs 3 and 4 each protrude out of the respective slot into the space enclosed by the core 1.

The outer side surface of the core 1 is applied with a thin (about 20 to 30 $\mu k$) layer 5 (FIG. 2) of copper or another material featuring high conductivity. The layer 5 applied to the front side surface in the left half of the core contacts only the plug 3, whereas in the right half of the core it contacts only the plug 4. Referring to FIG. 1, lines 6 and 7 indicate the boundaries of the coatings applied in the left and in the right halves of the core side surface. The layer 5 applied to the rear side surface, on the contrary contacts the plug 4 in the left half of the core, and the plug 3, in the right half of the core. The layer 5 applied to the upper, lower and lateral side surface, as is seen from FIGS. 3 and 4, does not contact either of the plugs 3 and 4. Thus applied, the layer 5 serves as a screen capable of diminishing the stray flux within the surfaces of the core 1. Concurrently, said layer serves as a closed electrical turn which induces an auxiliary electromagnetic field within the plugs 3 and 4. It is worth noting that the layer 5 may be applied within the zone of location of the coil 2 to the ribs only so as not to interfere with the induction of the electromagnetic field within the core 1.

When the inductance coil 2 is fed with a high-frequency current, a closed magnetic flux is created within the ferrite core 1. This field induces eddy currents within the plugs 3 and 4 that are capable of expelling the magnetic flux of the core 1 into the outer space of the zone of the gaps, thereby creating the stray flux $H_s$.

Since the plugs 3 and 4 somewhat protrude out of the gaps into the space confined or enclosed by the core 1, the magnetic stray flux is directed mostly opposite to such protruding positions.

Occurred concurrently with the stray flux $H_s$ and due to the eddy currents is an auxiliary stray flux induced by the current flowing through the layer 5 and the plugs 3 and 4. In this case the herein described connection of the plugs 3, 4 and the layer 5 provides phase coincidence of the stray fluxes creaked due to the effect of the core magnetic field and the current flowing through the plugs 3 and 4, with the result that the intensity and directivity of the magnetic stray flux are increased.

When a metal article to be controlled is introduced into the stray flux $H_s$, eddy currents appear within said article that change the total resistance of the inductance coil 2. The value of this changed resistance depends upon the coating thickness of the article or upon the distance for which the surface of the article is removed or spaced from the plug, and may be determined by resorting to any known measuring circuit.

Thus for example the transducer may be inserted into one of the arms of a high-frequency measuring bridge or into a resonance measuring circuit.

Let us briefly consider the operation of the transducer in contemplation by resorting to a device adapted to determine the coating thickness of a flat article.

The flat article made of a material which is alaogous to that made use of to manufacture the article under control, or the article proper with a surface portion which is not applied with the coating, is set close to the plug 3. Upon measuring the value of current flowing through the measuring bridge, the article under control is set with its coating close to the plug 3. Since the depth of penetration of the stray flux $H_s$ into the article is diminished due to the layer thickness, the value of the eddy current flowing through the article under control and, as has been described above, the total resistance of the inductance coil 2, are likewise changed, with the result that the current flowing through the measuring bridge will vary, the variation of the current corresponding to the coating thickness. Thus by the variation of the current we may readily determine the coating thickness.

It is clear from the description that analogously the profile of any article may be determined since with the variation of the distance from the surface of the article of the plug the current or voltage of the measuring device will be similarly changed.

One should have in mind that the stray flux within the zone of the plug 4 may be utilized in operation instead of the stray flux within the zone of the plug 3.

Described hereinabove is an optimal embodiment of the transducer featuring high response and accuracy.

In some cases where the requirements for the measuring accuracy are not high, the core may be implemented with one gap and without a screening coating.

The employment of the herein disclosed invention provides the possibility of determining the coating thickness of articles featuring flat, curvilinear surfaces, to effect control over articles featuring a stepped shape, to control the radial gaps between the working blades of a rotor and a turbine stator, or compressors, as well as to determine the runout and profile of electrical commutators directly in the process of operation, the accuracy of measurement of said parameters being approximately 1 to 2 $\mu k$.

What is claimed is:

1. An eddy current transducer for electrical devices for controlling and measuring coating thickness and surface profiles of metal articles of complex configuration, comprising a ferrite core having a pair of opposed gaps therein, an induction coil wound on said core, a pair of plugs fixed to said core and respectively disposed within each of said gaps and each having a portion protruding into the space enclosed by said core, each of said plugs comprising a highly conductive nonmagnetic material, and a coating of a high conductivity material on the outer side surfaces of said core selectively applied so as to avoid formation of a shorted turn enclosing a cross section of said core and to form a closed electrical turn including the plugs along a main flux path in said core, each of said plugs being in contact only with said coating on the opposite side surface of said core, whereby a screen defining a closed electrical turn is formed, and whereby an electromagnetic stray flux interacting with the article being measured is oriented in the direction of the respective axis of said plugs.

* * * * *